W. W. CRAIG.
CALCULATING INSTRUMENT.
APPLICATION FILED AUG. 21, 1911.

1,048,044.

Patented Dec. 24, 1912.

Witnesses
Stuart R. Allen
G. M. Moreland.

Inventor
William W. Craig.

UNITED STATES PATENT OFFICE.

WILLIAM WALLACE CRAIG, OF CHATHAM, NEW BRUNSWICK, CANADA.

CALCULATING INSTRUMENT.

1,048,044.   Specification of Letters Patent.   Patented Dec. 24, 1912.

Application filed August 21, 1911. Serial No. 645,174.

*To all whom it may concern:*

Be it known that I, WILLIAM W. CRAIG, of Chatham, in the Province of New Brunswick and Dominion of Canada, have invented certain new and useful Improvements in Calculating Instruments, of which the following is a full, clear, and exact description.

This invention relates to improvements in calculating instruments and the object is to provide a simple device for calculating and indicating the various lines and angles required by sheet metal workers in designing the various parts of pipe offsets, frustoconical containers and the like.

The instrument is designed to supplement or replace that part of geometrical designing known as plan and elevation drawing, as applied to general sheet metal work, and at the same time provide a convenient means of calculating lines and areas.

The device consists of a plate, preferably of metal, graduated vertically and horizontally in inches, and provided at the upper left hand corner with protractor scales. A pin is fixed at this corner on which a suitably graduated scale pivots. A bevel gage and a flexible rule are provided which may also be mounted on the pivot pin.

Figure 1:
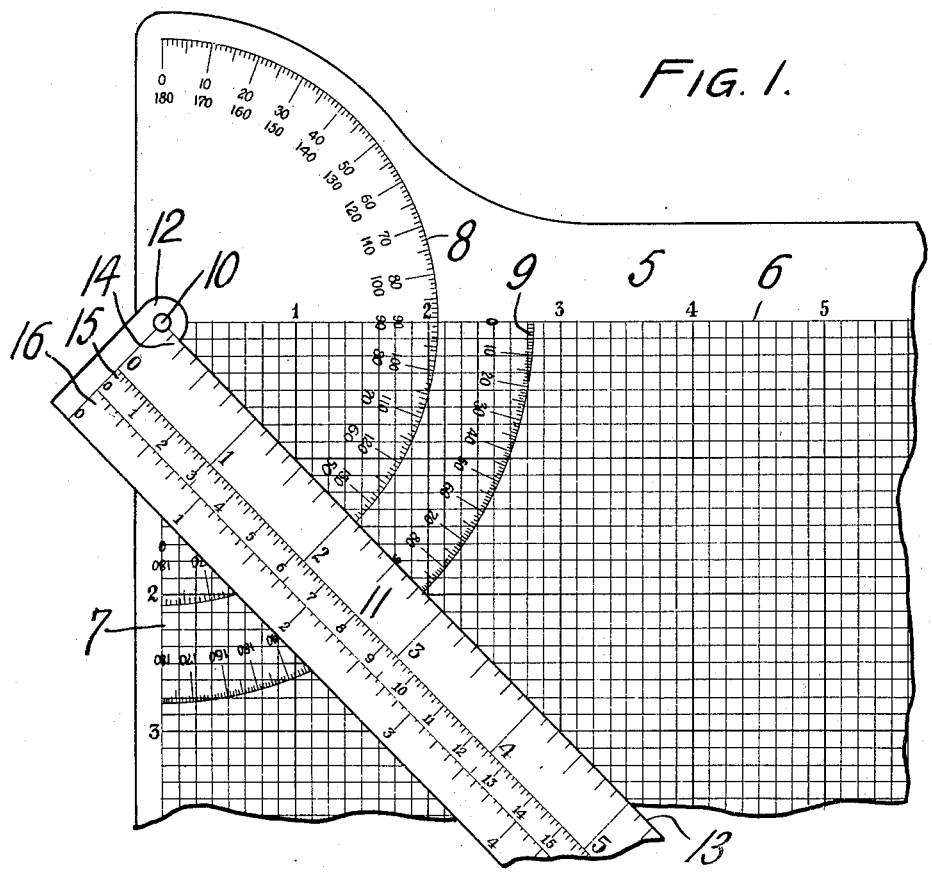
Figure 2:
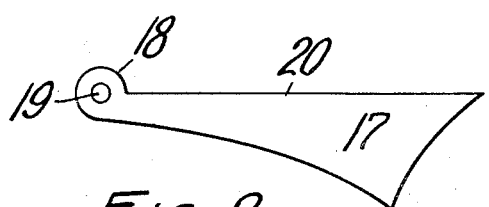
Figure 3:
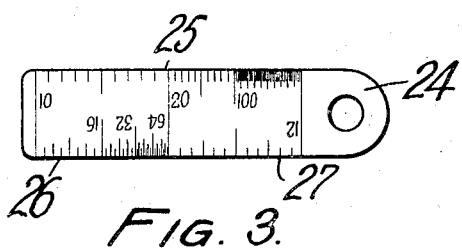
Figure 4:
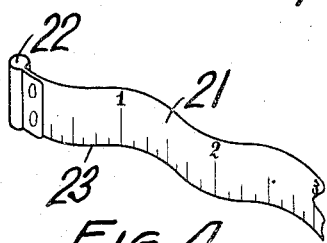

Referring to the drawings:—Figure 1 is a fragmentary plan view of the graduated plate with the pivoted scale in position. Fig. 2 is a plan view of the bevel gage. Fig. 3 is a plan view of changing scale accompanying the device. Fig. 4 is a perspective view of a fragment of the flexible rule.

In the drawings, 5 designates a plate, preferably of metal, graduated horizontally and vertically in inches, as shown at 6 and 7 respectively. These graduation lines extend across the plate and divide the surface into squares, as shown in the drawings. In the upper left hand corner of the plate, protractor scales 8 and 9 are formed having their centers at the corner or zero point of the graduated surface. Both protractor scales are graduated from 0° to 180°, the inner protractor scale 8 being of the usual form while the outer protractor scale is only 90° actual measurement, each half degree being considered as a whole degree. A pin 10 is fixed to the plate, the axis of this pin being at the exact center of the protractor scales. A bar 11 is provided having at one end a lug 12 through which the pin 10 passes, thus pivotally mounting the bar so that it may be swung freely over the graduated surface of the plate 5. The lug 12 allows the pin to be positioned centrally in line with the edge 13 of the bar, so that this edge will always be radial to any arc through which the bar is swung. The bar 11 is provided with a scale 14, graduated in inches, on the edge 13 and is also provided on the body with two additional scales 15 and 16. The scale 15 indicates the circumference of circles, the diameters of which are expressed in inches on the scale 14. The scale 16 gives the sides of squares equal in area to circles whose diameters are expressed in inches on the scale 14 which readings are obviously the square roots of the areas of the circles. The readings on the scales 15 and 16 represent inches; thus taking one inch as diameter, it will be seen that the corresponding reading on the scale 15 is slightly past the 3⅛ inches graduations, namely 3¼ inches. In the same way, the side of a square of equal area is shown on the scale 16 to be slightly greater than ⅞ of an inch. The area of the square may be readily obtained by squaring the measurement.

A bevel gage 17, shown in Fig. 2, is provided with a lug 18 to allow the pivot aperture 19 to be centrally in line with edge 20 of the gage. This gage is used on the upper half of the protractor scale 8 to ascertain the angle of the desired level.

A flexible rule 21, preferably made of a thin ribbon of spring steel looped at one end 22 to engage the pin 10 and hold the rule on edge, is provided with suitable graduations 23 in inches, and is used to determine the length of irregular lines.

A changing or comparing scale 24 accompanies the instrument, this scale being divided on one edge 25 from tenths to hundredths of an inch, and on the other edge, from sixteenths to sixty-fourths of an inch, at 26, and into twelfths of an inch at 27. This scale is used to change the usual divisions into twelfths or into hundredths, when it is desired to calculate in decimals, and to give irregular bisections to elevations as in the case of scoops etc.

The use or application of the device is very simple. To obtain the elevation of a cylinder the diameter is noted on the top scale 6 and the height on the side scale 7. The rectangle formed by the graduation lines from these points is the required elevation. If the cylinder is a pipe and it is desired to design an offset, the angle of the offset is first determined and the rule 11 moved to the graduation for this angle on the outer or miter protractor 9. The degrees of this protractor being in reality half degrees, will bisect the angle and give the true miter line. This miter line may be indicated on the plate 5 in any suitable manner. In developing the required curve to form the miter line of cylindrical bodies, it is customary to divide the circumference (on a plan view) into eight or more parts, transfer these divisions to an elevation having the miter line drawn thereon, and then transfer the intersections of the transfer and miter lines to a development of the cylinder, having parallel lines thereon corresponding to the division points on the circumference. The intersections of the parallels in the development and the second transfer lines, give points on the required curve. This method is tedious and allows great latitude for error. To obtain the eight circumferential divisions transferred to the elevation, the rule 11 is moved to 45° on the protractor 8 and the distance on the rule between the graduation indicating the diameter of the cylinder and the point of the rule's intersection with the adjacent side of the elevation is bisected. A vertical line drawn through this bisection point is one of the required lines. For example, supposing the pipe to be three inches in diameter, the elevation is that part of the graduated surface between the scale 7 and the vertical line of the three inch graduation in the scale 6. The rule 11 is moved to 45°, as shown, and the diameter of the cylinder, 3 inches, is found thereon. The distance from the three inch graduation to the point of the rule's intersection with the vertical 3 inch graduation line, is bisected. This intersection is seen on the drawing to be the 4¼ inch graduation on the rule. The point of bisection between 3 and 4¼ is, therefore, at the 3⅝ graduation, or ⅝ inch actual measurement. A vertical line drawn on the plate 5 through this point is one of the required eight lines. Measuring ⅜ inch from 0 on the rule, the position of the corresponding vertical on the left hand is found. The remaining vertical is in the center of the elevation, namely the vertical line of the 1½ inch graduation on the scale 6. These verticals are intersected by the miter line already formed. All the measurements may now be read on the instrument and transferred directly to the metal sheet from which the pipe is to be made. The development is marked on the sheet as usual. The length of the development for the required diameter is found on the circumference scale 15, and the required number of parallels marked which correspond to the circumference divisions. The distance of the intersection of the verticals with the miter line, from the top of the graduated surface, is indicated by the scale 7, and these distances are laid off on the metal sheet giving the points through which the curve for the miter line will pass.

To obtain the proper radius of arc for making a cone, take half the diameter of the base on the scale 6, say three inches, and move the rule to the graduation on the vertical 3 inch line indicating the altitude of the cone. The reading on the scale 14 of the rule where it intersects the vertical line is the required radius. When a given length of metal is to be divided into an equal number of parts, the following method will give quick and accurate results.

Supposing the length of the strip to be 5 inches and the required number of equal divisions to be 4, ¼ of 5 is found as follows:—Find 4 (the denominator of the fraction) on the top of the square, then find 1 (the numerator) on vertical line from 4. Hold the rule at this point and find 5 on the top of the square. The measurement on the vertical line from 5 where it is intersected by the rule will be found to be 1¼ which is the desired quotient.

The operation above set forth partly explains the arithmetical principles of the device as they may be used in working with fractions and mixed numbers.

Knowing that the square of the hypotenuse of a right angled triangle is equal to the combined squares of the base and altitude, and supposing the figures on top of square to represent bases, the vertical lines to represent altitudes and the rule to represent hypotenuses, it will be seen at a glance that this principle will be found very useful as well as very convenient.

A number of other useful geometrical and mathematical calculations may be made with great ease by means of this instrument, but a knowledge of these is not necessary to the complete understanding of the instrument as used for sheet metal work.

While the device has been shown and described as divided into inches, it is obvious that it may be divided according to the metric or any other system of measurement.

Having thus described my invention, what I claim is:—

A calculating instrument for sheet metal workers, comprising a plate having its surface graduated vertically and horizontally whereby the elevation and development of an object will be indicated, a protractor scale centered in one corner of the plate having fractions of degrees marked as whole degrees thereon, whereby the fractions of an angle will be found at the numeral indicating the whole angle, a bar pivoted at the center of said protractor scale, a scale on said bar arranged to indicate on the elevation shown by the plate the position of circumferential divisions, a second scale formed on said bar indicating the circumference of circles the diameter of which is indicated on the first scale, and a third scale on said bar indicating the square root of the areas of circles the diameters of which are indicated on the first scale.

In witness whereof I have hereunto set my hand in the presence of two witnesses.

WILLIAM WALLACE CRAIG.

Witnesses:
ROSS HARDING,
DAN DICKISON.